(12) United States Patent
Tan

(10) Patent No.: US 10,342,185 B2
(45) Date of Patent: Jul. 9, 2019

(54) SUN TRACKING GROWING SYSTEM FOR PHOTOSYNTHETIC ORGANISMS

(71) Applicant: Weixing Tan, Grande Prairie (CA)

(72) Inventor: Weixing Tan, Grande Prairie (CA)

( * ) Notice: Subject to any disclaimer, the term of this patent is extended or adjusted under 35 U.S.C. 154(b) by 349 days.

(21) Appl. No.: 14/895,849

(22) PCT Filed: May 14, 2014

(86) PCT No.: PCT/CA2014/050450
§ 371 (c)(1),
(2) Date: Dec. 3, 2015

(87) PCT Pub. No.: WO2014/197978
PCT Pub. Date: Dec. 18, 2014

(65) Prior Publication Data
US 2016/0120136 A1    May 5, 2016

(30) Foreign Application Priority Data

Jun. 10, 2013 (CA) ..................................... 2818045

(51) Int. Cl.
*A01G 9/24* (2006.01)
*F24S 20/00* (2018.01)
(Continued)

(52) U.S. Cl.
CPC ............... *A01G 9/243* (2013.01); *F24S 20/61* (2018.05); *F24S 50/20* (2018.05); *F24S 2020/16* (2018.05);
(Continued)

(58) Field of Classification Search
CPC .......... A01G 9/02; A01G 9/022; A01G 9/023; A01G 9/024; A01G 9/025; A01G 9/027;
(Continued)

(56) References Cited

U.S. PATENT DOCUMENTS 125,928 A * 4/1872 Blake .................. A47F 5/02
211/78
191,183 A * 5/1877 Sampson ............... A47B 1/03
108/17

(Continued)

FOREIGN PATENT DOCUMENTS

CN         201742773 U      2/2011
KR    20-2011-0000268 U    1/2011
(Continued)

OTHER PUBLICATIONS

Meinhold, B., "Parisian Window Planter Lets and Raise and Lower Your Veggies for More Sun," inhabitat, Aug. 28, 2012, <http://inhabitat.com/parisian-window-planter-lets-and-raise-and-lower-your-veggies-for-more-sun/> [retrieved Jul. 16, 2014], 7 pages.
(Continued)

*Primary Examiner* — Tien Q Dinh
*Assistant Examiner* — Ebony E Evans

(57) ABSTRACT

A sun tracking plant growing system includes a body having a first face, a second face opposed to the first face and a peripheral connecting edge which is relatively small, as compared to the size of the first face and the second face. A mounting enables the body to pivot about a pivot axis. Plant supports, which receive plants, are supported by the body. A sun tracking mechanism is provided which senses or calculates the position of the sun and adjusts the orientation of the body about the pivot axis to maintain a selected portion of the peripheral connecting edge of the body facing the sun so as to provide desirable and naturally attenuated sunlight exposure according to plants' needs on both faces throughout a day. This system allows that multiple rows or single row of the plural bodies are arrayed closely together without creating shadows to each other.

19 Claims, 6 Drawing Sheets

(51) Int. Cl.
*F24S 50/20* (2018.01)
*F24S 20/61* (2018.01)
*F24S 30/00* (2018.01)

(52) U.S. Cl.
CPC ...... *F24S 2030/131* (2018.05); *F24S 2030/18* (2018.05); *Y02A 40/266* (2018.01); *Y02B 10/20* (2013.01); *Y02P 60/124* (2015.11)

(58) Field of Classification Search
CPC ........ A01G 9/028; A01G 9/243; A01G 9/021; F24J 2/38; F24J 2/40; F24J 2/54
USPC .... 47/65; 126/571, 572, 573, 574, 575, 576, 126/577, 578, 600, 601, 602, 603, 604, 126/906
See application file for complete search history.

(56) References Cited

U.S. PATENT DOCUMENTS

| | | | | |
|---|---|---|---|---|
| 435,470 | A * | 9/1890 | Weston | A47B 1/03 108/17 |
| 1,830,373 | A * | 11/1931 | Schmidt | B60P 3/055 211/164 |
| 3,529,379 | A * | 9/1970 | Ware | F24F 3/12 47/17 |
| D223,677 | S * | 5/1972 | Wienert | 47/65 |
| 3,664,063 | A * | 5/1972 | Ware | A01G 9/022 108/23 |
| 3,998,007 | A * | 12/1976 | Martin | A01G 9/00 285/125.1 |
| 4,045,911 | A * | 9/1977 | Ware | A01G 7/045 108/23 |
| 4,079,725 | A * | 3/1978 | Chadick | F24J 2/10 126/601 |
| D258,206 | S * | 2/1981 | Bourke | 47/39 |
| 4,304,221 | A * | 12/1981 | Trihey | F24J 2/10 126/581 |
| 4,365,617 | A * | 12/1982 | Bugash | F24J 2/07 126/578 |
| 4,649,899 | A * | 3/1987 | Moore | F24J 2/38 126/572 |
| 4,730,602 | A * | 3/1988 | Posnansky | F24J 2/10 126/605 |
| 4,807,592 | A * | 2/1989 | Trihey | F24J 2/145 126/574 |
| 4,969,290 | A * | 11/1990 | Skoretz | A01G 9/04 108/20 |
| 5,169,456 | A * | 12/1992 | Johnson | F24J 2/085 126/607 |
| D332,186 | S * | 1/1993 | Bellaflores | D21/829 |
| 5,896,699 | A * | 4/1999 | Livingston | A47G 7/041 47/39 |
| D411,136 | S * | 6/1999 | Avey | D11/149 |
| 7,020,999 | B1 * | 4/2006 | Stouffer | A47G 7/047 47/67 |
| 7,051,476 | B1 * | 5/2006 | Craul | A01G 9/1423 47/17 |
| D634,134 | S * | 3/2011 | Gingrich | D6/405 |
| D699,044 | S * | 2/2014 | Bowling | D6/405 |

FOREIGN PATENT DOCUMENTS

| | | |
|---|---|---|
| WO | 2007/087343 A2 | 8/2007 |
| WO | 2009/018618 A1 | 2/2009 |
| WO | 2014/198838 A1 | 12/2014 |

OTHER PUBLICATIONS

International Search Report and Written Opinion dated Aug. 18, 2014, issued in corresponding International Application No. PCT/CA2014/050450, filed May 14, 2014, 7 pages.

* cited by examiner

SUN TRACKING GROWING SYSTEM FOR PHOTOSYNTHETIC ORGANISMS

FIELD

There is described a growing system for photosynthetic organisms, such as plants and algae, that tracks the movement of the sun in a fashion to allow desirable and controlled sunlight exposure.

BACKGROUND

Although sun-tracking systems are commonly used with solar collectors to allow maximum solar collection by tracking the movement of the sun across the sky, growing systems for plants are generally fixed. As a result, plants are in direct sunlight for a portion a day often over-exposed with too much light particularly when sunlight energy is highest and in indirect sunlight or shade for the balance of the day leading to insufficient light. What is required is a sun tracking system that meets the needs of photosynthetic organisms such as plants and algae.

SUMMARY

According to one aspect, there is provided a sun tracking growing system including a body having a first face, a second face opposed to the first face and a peripheral connecting edge which is relatively small, as compared to the size of the first face and the second face. A mounting enables the body to pivot about a pivot axis. Plant supports, which receive plants, are supported by the body along the first face, the second face or both. A sun tracking mechanism is provided which senses or calculates the position of the sun and adjusts the orientation of the body about the pivot axis to maintain a selected portion of the peripheral connecting edge of the body facing the sun.

With the sun tracking growing system, as described above, plants supported along either the first face, the second face or both are directly exposed to sunlight throughout the day, without shading each other. Sun tracking systems used with solar collectors are designed to maximize sunlight exposure and as such, tend to overexpose plants throughout an extended period of a day when the light energy is highest, since photosynthesis is saturated at one twentieth to one quarter of full sunlight for most plants. In contrast, the sun tracking growing system described allows for the adjustment and natural attenuation of sunlight exposure according to what plants need.

According to another aspect there is provided a method of having a growing system tracking the sun. A first step involves providing a body having a first face, a second face opposed to the first face and a peripheral connecting edge which is relatively small, as compared to the size of the first face and the second face. A second step involves mounting the body to pivot about a pivot axis. A third step involves placing plants into plant supports which are supported by the body along the first face, the second face, or both. A fourth step involves sensing or calculating the position of the sun. A fifth step involves adjusting the orientation of the body about the pivot axis to maintain a selected portion of the peripheral connecting edge of the body facing the sun.

There can be a number of ways to enable the orientation adjustment of the growing body (or panel). For example, one way is to align the body towards South and North, and move along with the daily changes in sunray so that the two sides of panel are always in parallel to the sunray. Another possible example is to align the body towards East and West, and adjust along with the seasonal as well as daily changes in sun's altitude (or sunray) so as to maintain the two sides of panel always in parallel to the sunray.

It will be appreciated that there are a number of ways the pivot axis can be arranged. For example, the pivot axis about which the body pivots could be a substantially horizontal pivot axis. Alternatively, the pivot axis about which the body pivots could be a substantially vertical pivot axis. Although horizontal and vertical are the most logical orientations for the pivot axis, it would also be possible to place the pivot axis in an orientation that is neither horizontal nor vertical.

While there could be a single body, it is envisaged that there will be a plurality of bodies positioned in parallel spaced relation, each of the bodies tracking the sun concurrently.

While there could be a single row of plural bodies, it is envisaged that there will be multiple rows of plural bodies positioned in parallel with all rows tracking the sun concurrently.

The body can take a number of forms. It could be a solid growing wall, In the preferred embodiment the body is an open frame with plants are supported along the first face, the second face or both by plant supports. When growing algae, the plant supports are any containers like cylindrical tubes or fiat panels containing liquid nutrients.

It is envisaged that the plants or cylindrical tubes will be positioned in spaced relation along one of a width or a length of the frame. In order for light to reach the plants or algae from all sides, it is preferred that the plants or cylindrical tubes are staggered, so that they are alternatively positioned toward first face and then toward the second face, which allows light to reach the back side of plant supports.

Different species or varieties of plants require or can tolerate different amounts of sunlight. It is preferred that the body is wedge shaped and a thin edge of the wedge is the selected portion of the peripheral connecting edge of the body which is maintained facing the sun as the movement of the sun is tracked. The amount of sunlight exposure is determined by the angular relationship between the first face and the second face (i.e. the tapering of the panel in the middle). When the first face and the second thee are parallel, there is a minimal sunlight reaching the plants on both sides. As the angle between the first face and the second face increases, the sunlight exposure of the first face and the second face also increases. This enables the body to be tailored to suit the needs of a particular species of plants. It will be appreciated that When the angle of the first thee and the angle of the second face is equal, the first face and the second face receive equal sun exposure. It will also be appreciated that the angle of the first face and the angle of the second face may also be unequal, so that the first face and the second face receive unequal sun exposures so as to suit different needs of different plant species or varieties.

The sun is not available at night or when there is heavy cloud cover. For that reason, even more beneficial results may be obtained when an artificial light source is supported by the body to provide artificial light to the plant supports when sunlight is not available or insufficient. The addition of artificial light creates a hybrid growing system capable switching between sunlight and artificial light, as required.

As the growing systems are scaled up in size, the weight increases and movement becomes more difficult. Even more beneficial results may, therefore, be obtained when the sun tracking mechanism includes a hydraulic or mechanical spring and/or weight supports to assist in movement of the body.

Although the growing body is, in general, fixed on a flat ground, potential beneficial results may be obtained by adjusting the slope or aspect of the body, relative to the wound, in order, for example, to synchronize with the seasonal changes in sun's altitude.

BRIEF DESCRIPTION OF THE DRAWINGS

These and other features will become more apparent from the following description in which reference is made to the appended drawings. The drawings are for the purpose of illustration only and are not intended to be in any way limiting, wherein.

DETAILED DESCRIPTION

Figure 1A:
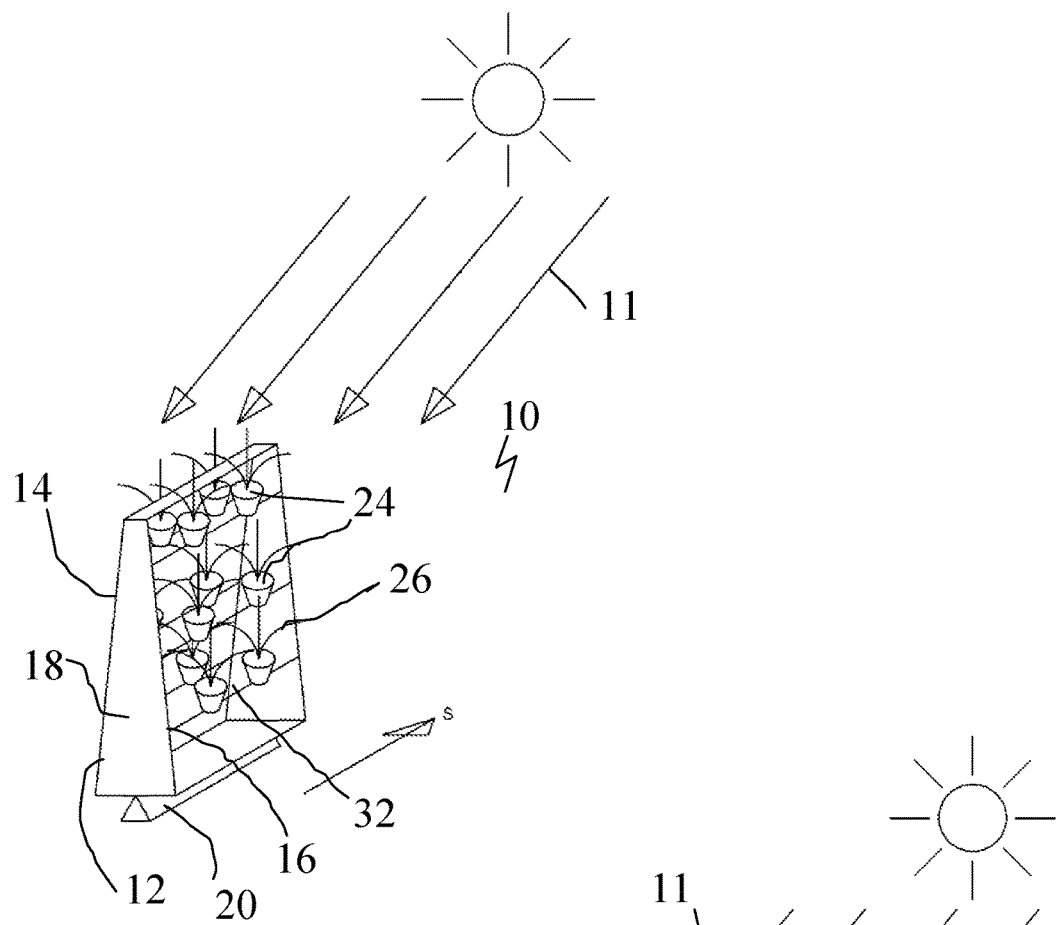
FIGS. 1a and 1b are 3-D views of the panel system on a base pivot (horizontal axis), illustrating that aligning the side and/or top of the panel directly to the sunray (e.g. south) allows sunlight to reach both sides of the panel equally with examples of either plant holders (1a) or algae tubes (1b).

A sun tracking growing system for photosynthetic organisms, generally identified by reference numeral 10 in all figures, will now be described with reference to FIG. 1 through 10. When the term "plants" is used herein, it will be understood that it is used as a shorthand term to cover photosynthetic organisms generally, unless the context requires otherwise.

Figure 1B:
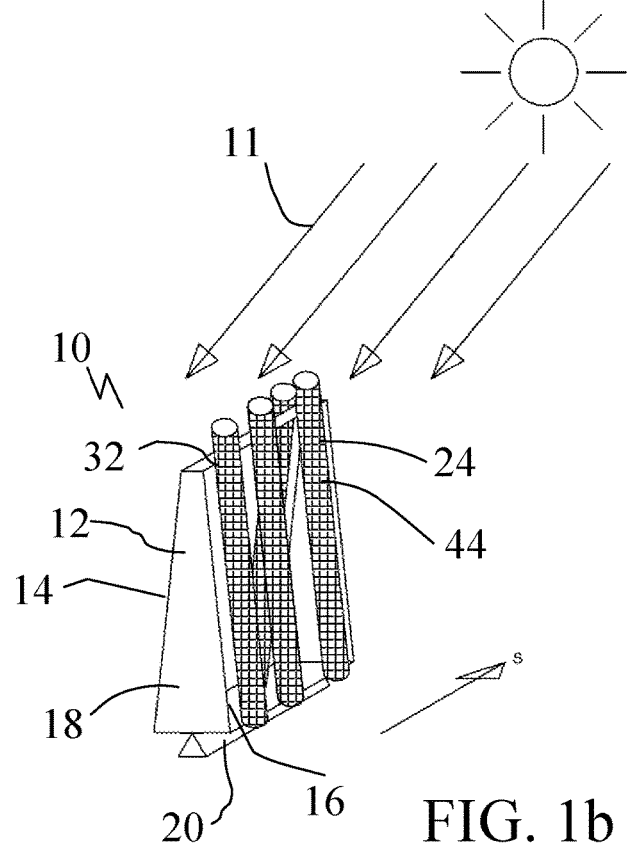
Figure 2:
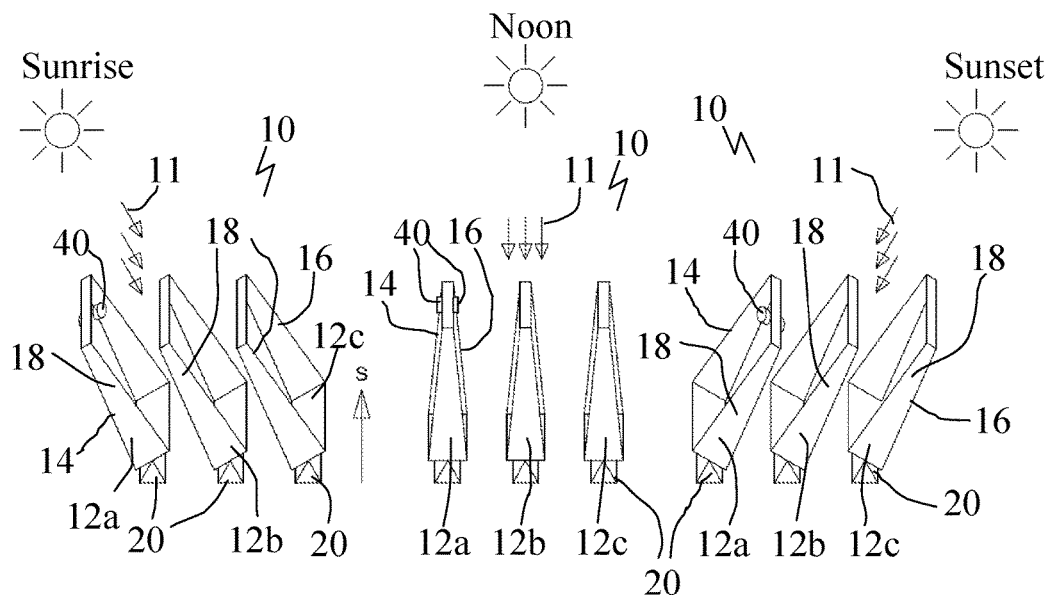
FIG. 2 is a 3-D side view of the bodies on a horizontal pivot axis aligned south and north tracking sunray movement during the sunrise, noon and sunset in a day.

Structure and Relationship of Parts:

Retelling to FIG. 1a and FIG. 1b, sun tracking growing system 10 includes a body 12 with a first face 14 and a second face 16 with a peripheral connecting edge 18. First face 14 and second face 16 are positioned in opposition to each other. Peripheral connecting edge 18 is generally small in comparison to the size of first face 14 and second face 16. A mounting 20 is attached to body 12 which enables it to pivot about a pivot axis. Body supports plant supports 24 for receiving plants 26. Pivot axis may be substantially horizontal, substantially vertical or angular based upon the positioning of body 12 and the motion required to track the sun. In the illustrated embodiment a substantially pivot axis is horizontal. Referring to FIG. 2, a sun tracking sensor 40 is provided which senses the position of the sun. Light sensors 40 are provided on each side of body 12 and sense changes in the amount of light hitting each side of the faces. It will be understood that other different methods of sun tracking may be used, including sunray tracking calculations and temperature sensors. As shown, sun tracking sensor 40 may be positioned on a single body 12a when an array of bodies 12a, 12b and 12c are positioned together. It will be understood, however, that each body 12a, 12b and 12c may have a sun tracking sensor 40. Sun tracking sensors 40 may also be used to maintain first face 14 and second face 16 of body 12 in specific orientations to provide specific portions of sunlight to each of first face 14 and second face 16. For example, where equal light is required by first face 14 and second face 16, light in sensor 40 on first face 14 should remain equivalent to light in sensor 40 on second face 16. If different light proportions are required for each of first face 14 and second face 16, sensors 40 maintain the relative proportions of light and adjust accordingly.

Figure 9:
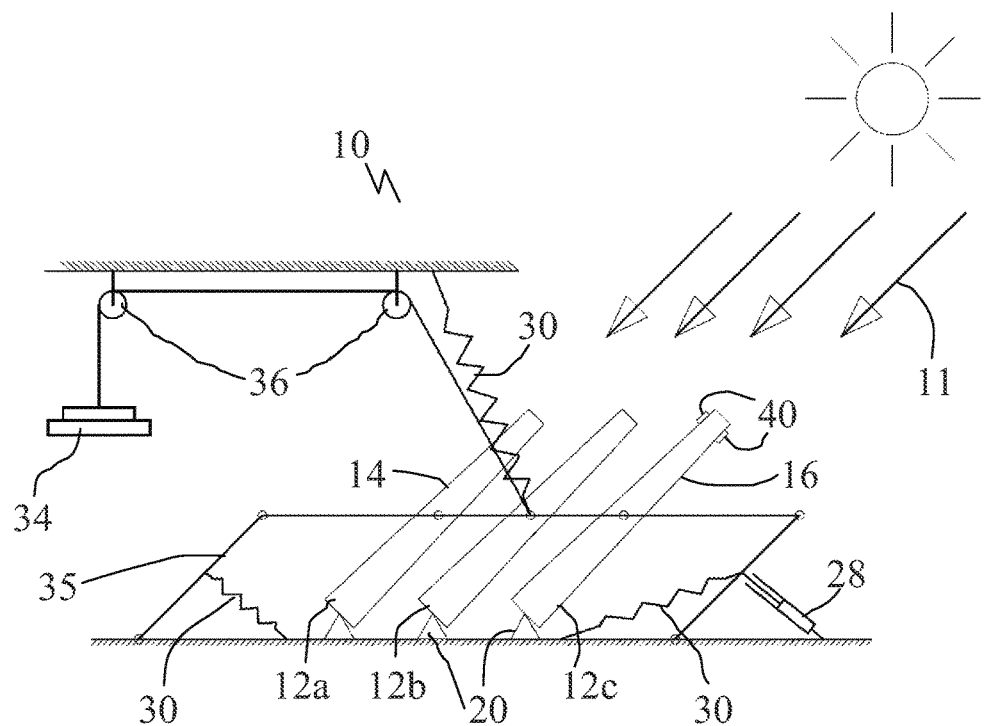
FIG. 9 is a side elevation view of weight support mechanisms coupling with actuator controller to assist movement of sun tracking growing system for photosynthetic organisms.

Referring to FIG. 9, as an example, control of sunlight tracking can be achieved by using an actuator 28 which receives sensing data from sun tracking sensor 40 and then adjusts its arm length so as to result in a rotational movement of supporting parallelogram frame 35, thereby changing the orientation of body 12 about a pivot axis to maintain a selected portion of peripheral connecting edge 18 of body 12 facing the sun. A plurality of bodies 12a, 12b and 12c may be positioned in parallel spaced relation, with each of bodies 12a, 12b and 12c linked in movement to track the sun concurrently. Plurality of bodies 12a, 12b and 12c are tied together on the supporting frame 35 so that all of the bodies move in unison along with the movement of parallelogram frame 35.

Figure 10:
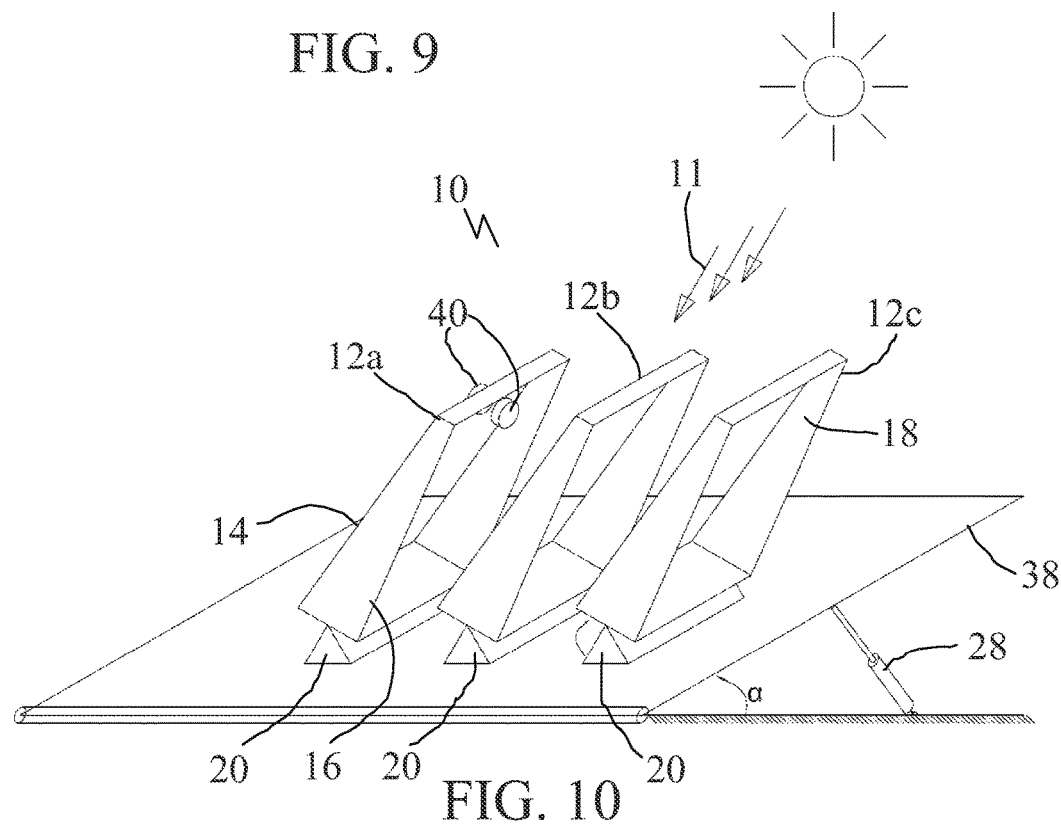
FIG. 10 is a 3-D view that shows the adjustments of the slope for the panels (i.e. α), for example, to allow desirable alignment with the seasonal changes in sun's altitude.

Referring to FIG. 9, the movement of body 12 along with supporting parallelogram frame 35 can be facilitated by a hydraulic or mechanical spring accumulator 30, which assists in handling the weight of bodies 12a, 12b, and 12c and overcoming inertia. In the embodiment shown, weights 34 can also be used in conjunction with pulleys 36 to assist in handling the weight of bodies 12a, 12b and 12c. Referring to FIG. 10, pivotal mountings 20 of bodies 12a, 12b and 12c may be positioned on a movable base 38 that can be tilted to a selected slope α using actuator controller 28.

Figure 3:
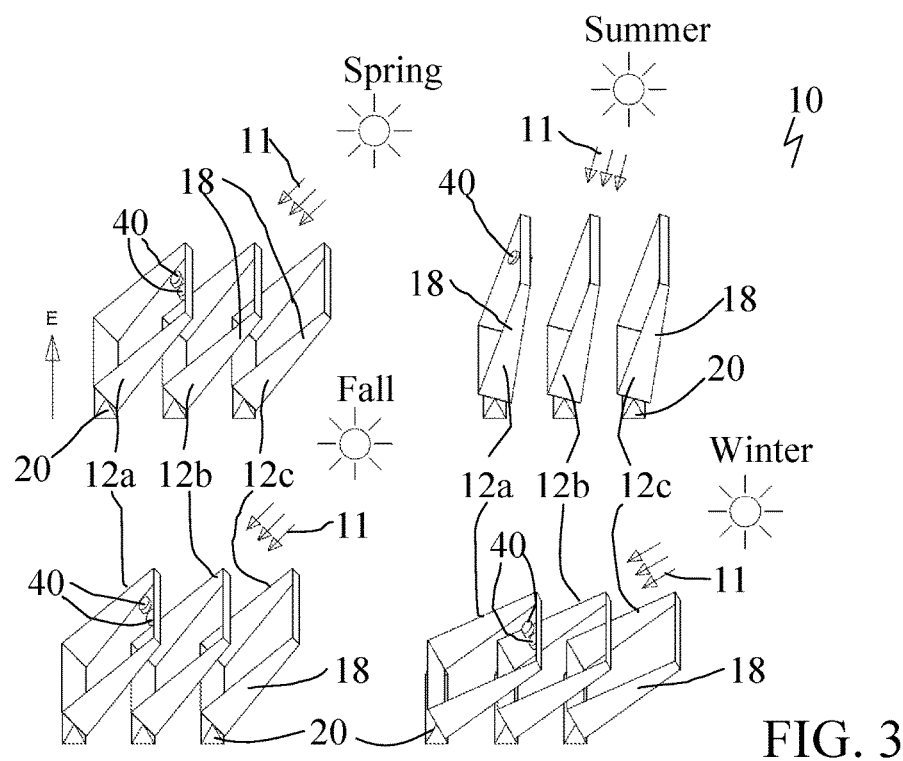
FIG. 3 is a 3-D side view, of the bodies on a horizontal pivot axis which aligned East and West tracking sunray movement during different seasons.

The orientation adjustment of body 12 may occur in a number of different ways. For example, referring to FIG. 2, body 12 may be aligned toward the south and north and move along with the daily changes in sunray 11 such that plurality of bodies 12a, 12b and 12c are always in parallel to sunrays 11. This type of alignment allows for large numbers of bodies 12 to be arrayed closely together in multiple straight rows, without shading each other, and may be used anywhere but is most useful in regions close to the Earth's poles (e.g. temperate, boreal and polar regions). Referring to FIG. 3, it is also possible to align bodies 12a, 12b and 12c toward east and west and adjust along with both seasonal and daily changes in the sun's altitude to maintain bodies 12a, 12b and 12c in parallel to sunrays 11. This type of alignment also allows for large numbers of bodies 12 to be arrayed closely together in multiple straight rows, without shading each other, and may be used anywhere but is most useful in regions close to the Earth's equator (e.g. subtropical and tropical regions).

Figure 4:
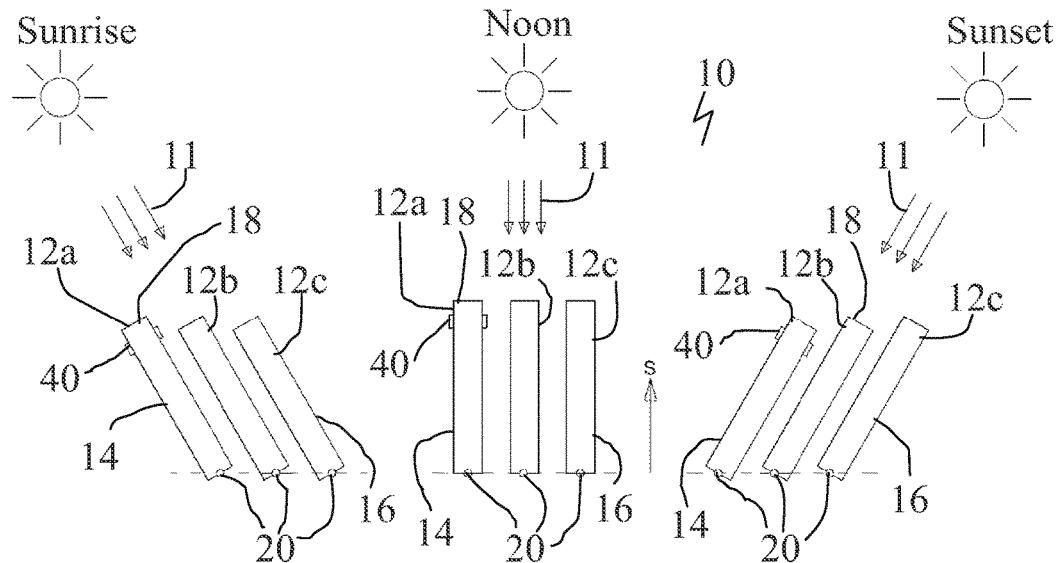
FIG. 4 is a top plan view of bodies on a side-vertical pivot axis aligned south and north.
Figure 5:
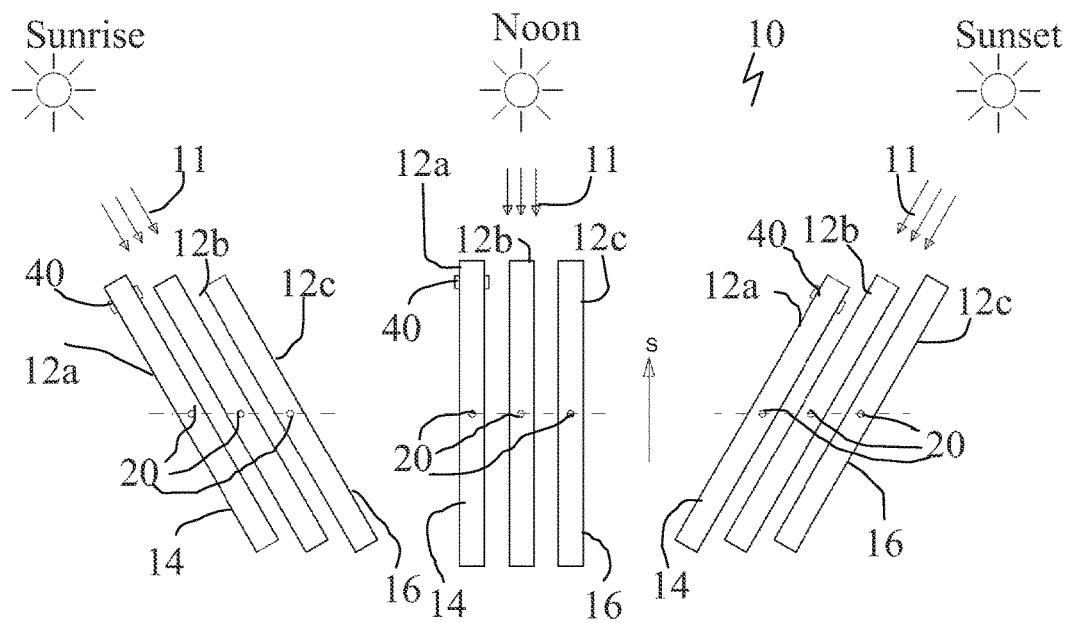
FIG. 5 is a top plan view, of bodies on a central-vertical pivot axis aligned south and north.

There are a number of ways in which pivot axis of body 12 may be set up. For example, referring to FIGS. 2 and 3, body 12 may be set up on a substantially horizontal pivot axis. A substantially horizontal pivot axis allows for large numbers of bodies 12 to be arrayed closely together in multiple rows without shading each other. Referring to FIGS. 4 and 5, on the other hand, bodies 12a, 12b and 12c may be set up on a substantially vertical pivot axis. With a vertical pivot axis, however, multiple rows of bodies 12 cannot he arrayed closely together without creating shadows from the first row over the subsequent row(s).

Figure 6:
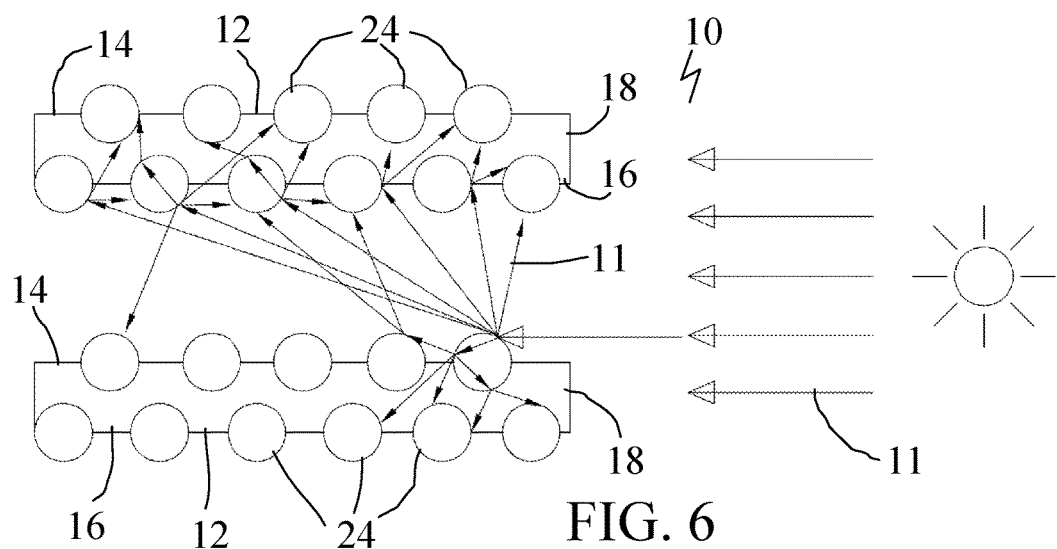
FIG. 6 is a top plan view of the body illustrating that the alternating positions of plant holders or tubes on both sides of the panel enables capture of reflected and deflected sunlight reaching to all surfaces of holders or tubes.

Referring to FIG. 1a, body 12 may include plant supports 24 within frame 32 or referring to FIG. 1b, body 12 may include a plurality of cylindrical tubes 44 containing liquid nutrients within frame 32. Plant supports 24 or cylindrical tubes 44 may be positioned in spaced relation along one of a width or length of frame 32. Referring to FIG. 6, plant supports 24 or cylindrical tubes 44 may also be staggered so that they are alternatively positioned toward first face 14 and then toward second face 16. This orientation of plant supports 24 allows sunlight 11 to reach all sides of plant supports 24.

Figures 7A, 7B, 7C:
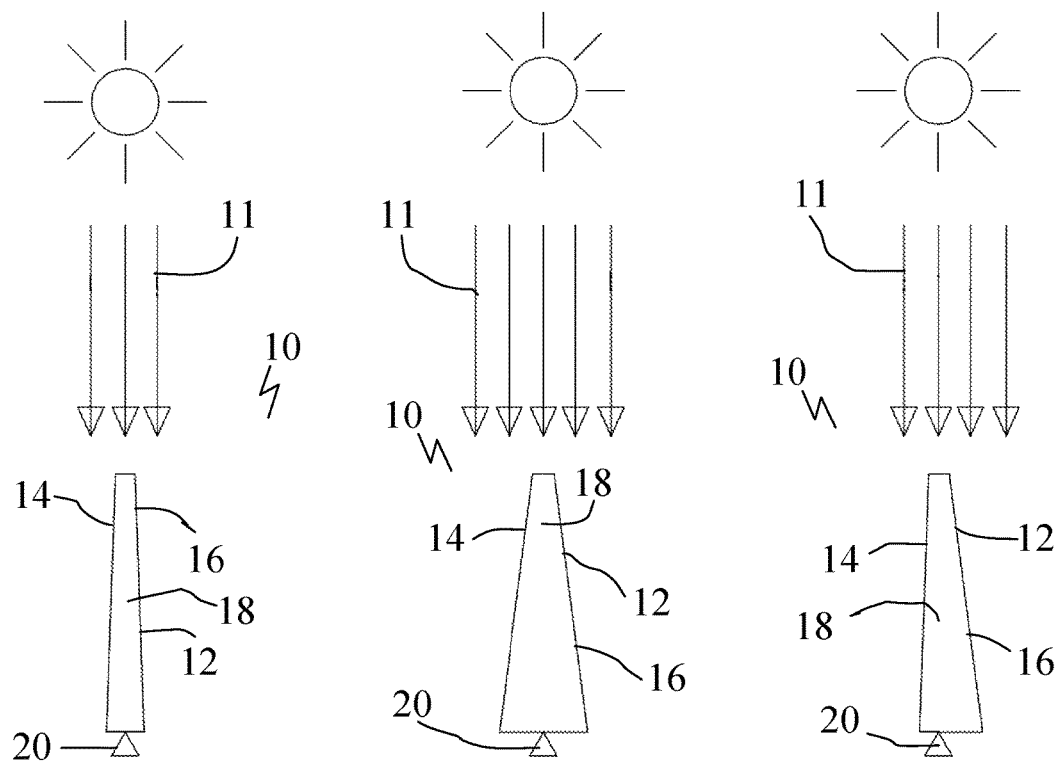
FIGS. 7a, 7b and 7c are end views of the panel on a horizontal pivot axis, illustrating that adjusting the degree of tapering on the panel allow for different levels of sunlight intensity exposed on each side of the panel with an example with less desirable but equal amount of light exposure on both sides (sharper tapering, FIG. 7a), an example with higher desirable but equal amount of light exposure on both sides (gentler tapering, FIG. 7b), and an example with unequal amount of light exposures on both sides (FIG. 7c)

Referring to FIG. 7a, 7b, 7c, body 12 is preferably wedge-shaped with the thin edge of the wedge being the peripheral connecting edge 18 of body 12. Peripheral connecting edge 18 of body 12 is maintained facing the sun as the movement of the sun is tracked. Referring to FIG. 2, first face 14 and second flee 16 of body 12 are preferably rectangular or S square with four sides or can be in an shape. Referring to FIG. 7a, 7b, 7c, the relative angle of first face 14 to second face 16 determines sun exposure. The greater the angle, the greater the exposure to sunlight 11. For example, plants supported by body 12 as illustrated in FIG. 7b, receive greater exposure to sunlight 11, as compared to plants supported by body 12 as illustrated in FIG. 7a. Referring to FIG. 7a and FIG. 7b, first face 14 and second face 16 may define an equilateral triangle, so that first face 14 and second face 16 receive equal exposure to sunlight 11. However, referring to FIG, 7c, the angle of first face 14 and second face 16 may be unequal so that first face 14 and second face 16 receive unequal exposure to sunlight 11. This allows for different plants that require different levels of sun exposure to be positioned on opposite faces of the same body 12.

Figure 8A:
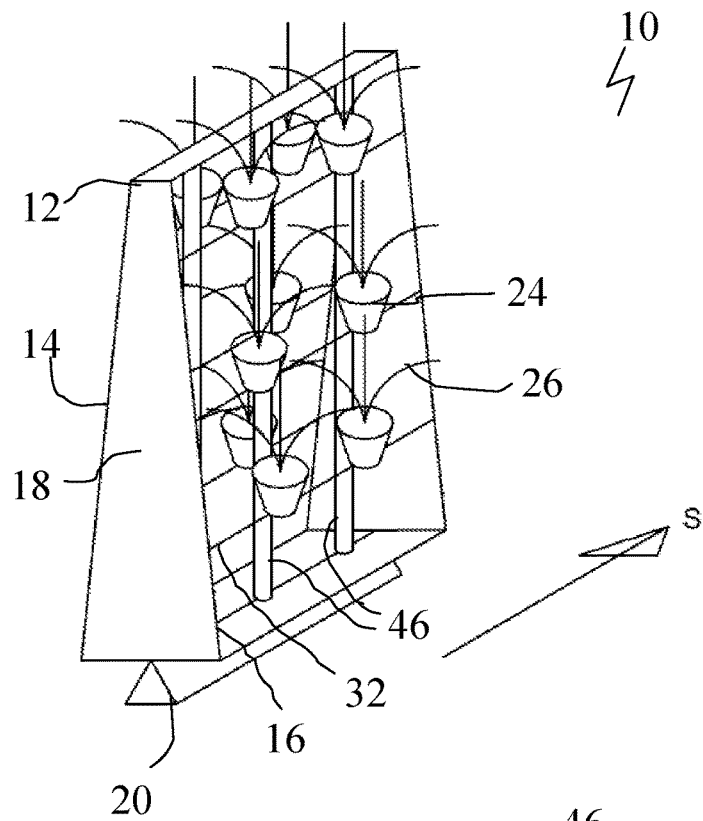
FIGS. 8a and 8b are 3-D views showing example of arrangements of artificial lights between plant holders or tubes (8a) or placement of lights inside tubes (8b) for a hybrid light-source growing system (also refer to FIG. 1).
Figure 8B:
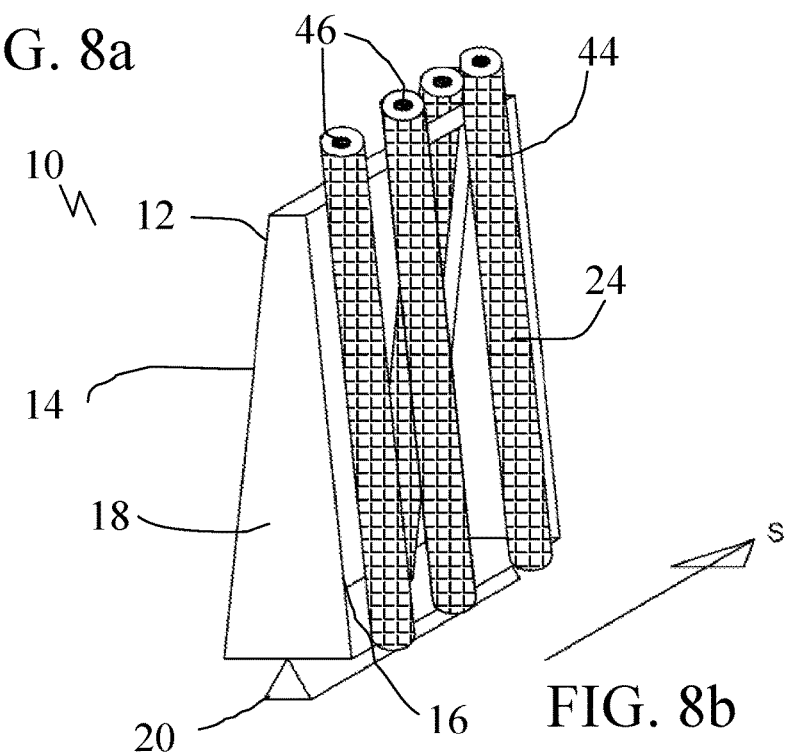

Referring to FIG. 8a and FIG. 8b, an artificial light source 46 may be supported by body 12 to provide artificial light to plant supports 24 or cylindrical tubes 44, when sunlight is not available. Artificial light source 46 may be in the form of fluorescent lights or any other type of light suitable for providing artificial light. The artificial light sources 46 may also be placed in a number of different ways, such as inside of tubes 44.

Operation:

Referring to FIG. 7a, 7b, 7c, body 12 for sun tracking growing system 10 is selected to suit the variety of plant being grown. Referring to FIG. 7a, plants that have sunlight sensitivities are positioned along first flee 14 and second face 16 of body 12 with a sharper tapering. Referring to FIG. 7b, plant that require greater exposure to the sunlight 11 are placed along first face 14 and second face 16 of body 12, where first face 14 and second face 16 are angled outwardly at a greater angle. If the angles are equal, first face 14 and second face 16 will receive equal exposure to sunlight 11.

This is suitable when body 12 is supporting a single variety of plant or varieties of plants that require similar exposure to sunlight 11. Referring to FIG. 7c, if the angles are not equal, first face 14 and second face 16 will receive different amounts of sun exposure or sunlight 11. This allows a single body 12 to have plants with different sun exposure requirements present on each of first face 14 and second face 16.

Referring to FIG. 1a and FIG. 1b, body 12 has mounting 20 which pivots along a pivot axis. Pivot axis may be substantially vertical, substantially horizontal or any angle based upon the positioning of body 12 and the motion required to track the sun. For example, referring to FIGS. 2 and 3, body 12 may be set up on a substantially horizontal pivot axis. A substantially horizontal pivot axis allows for large numbers of bodies 12 to be arrayed in multiple rows closely together without creating shadows to each other. Referring to FIGS. 4 and 5, body 12 may also be set up on a substantially vertical pivot axis. However, bodies 12 on a vertical pivot axis, which may be easier to be built and controlled, cannot be arrayed in multiple rows closely together as the front row will create shadows on the subsequent rows. Plants are placed into plant supports 24 that are supported by body 12. In the embodiments shown, plant supports 24 may support plant pots as shown in FIG. 1a or cylindrical tubes 44 containing liquid nutrients as shown FIG. 1b. It will be understood that the plant supports 24 may be of any shape or size. The tubes 44 containing liquid nutrients are just one of many ways suited for growing photosynthetic organisms such as algae Which grow in liquid media.

Referring to FIG. 2, sun tracking sensor 40 is provided which senses the position of the sun. Referring to FIG. 9, a controller 28 is provided which receives sensing data from sun tracking sensor 40 and then adjusts its arm length, resulting in a rotational movement of supporting frame 35, thereby changing the orientation of body 12 about a pivot axis to maintain a selected portion of peripheral connecting edge 18 of body 12 facing the sun. Referring to FIGS. 2-5, the manner in Which body 12 moves when tracking the sun is illustrated. A plurality of bodies 12a, 12b and 12c may be positioned in parallel spaced relation in one row or multiple rows, with all bodies or rows linked in movement to track the sun in unison. Referring to FIG. 9, the movement of body 12 along with supporting parallelogram frame 35 is facilitated by a hydraulic or mechanical spring accumulator 30, Which assists in handling the weight of bodies 12a, 12b, and 12c and overcoming inertia. Weights 34 can also be used in conjunction with pulleys 36 to assist in handling the weight of bodies 12a, 12b and 12c. Bodies 12a, 12b and 12c are connected together by parallelogram frame 35 so that bodies 12a, 12b and 12c move together when the frame 35 is moved rotationally. Referring to FIG. 10, pivotal mountings 20 of bodies 12a, 12b and 12c may be positioned on a movable base 38 that can be tilted to a selected slope $\alpha$ using actuator controller 28.

Referring to FIG. 8a and FIG. 8b, an artificial light source 46 may be supported. by body 12 to provide artificial light to plants supports 24 or cylindrical tubes 44 supported on body 12 when sunlight is not available. The number of light sources 46 and the intensity of light source 46 are dependent upon the requirements of the plants 26 being supported by body 12. The artificial light sources 46 may also be placed inside tubes 44.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to be understood to include what is specifically illustrated and described above, what is conceptually equivalent, and what can be obviously substituted. The scope of the claims should not be limited by the preferred embodiments set forth in the examples, but should be given the broadest interpretation consistent with the description as a whole.

What is claimed is:

1. A sun tracking growing system, comprising:
    a plurality of tapered bodies, each tapered body having a first face, a second face opposed to the first face and a peripheral connecting edge that connects the first face and the second face, the first face and the second face tapering toward a top portion of the peripheral connecting edge such that the first face and the second face are on opposite sides of the peripheral connecting edge and face outward relative to the peripheral connecting edge, the peripheral connecting edge having a surface area that is smaller than a surface area of the first face and the second face;
    a mounting enabling each tapered body to pivot about a pivot axis;
    plant supports which receive plants supported along the first face, the second face or both the first face and the second face of each tapered body;
    a sun tracking mechanism which senses or calculates a position of the sun and adjusts an orientation of each tapered body about the pivot axis to maintain a selected portion of the peripheral connecting edge of each tapered body facing the sun so as to provide desirable and naturally attenuated sunlight exposure according to plants' needs, wherein both faces are exposed to sunlight throughout a day; and
    wherein an array comprising one or more rows of a plurality of bodies can be disposed closely together without creating shadows on each other.

2. The sun tracking growing system of claim 1, wherein the peripheral connecting edge comprises a frame and the plant supports are supported by the frame.

3. The sun tracking growing system of claim 2, wherein the plant supports are positioned in spaced relation along one of a width and a length of the frame.

4. The sun tracking growing system of claim 3, wherein the plant supports are alternatively positioned toward the first face and then toward the second face.

5. The sun tracking growing system of claim 2, wherein the plant supports are cylindrical tubes or flat panels containing liquid nutrients.

6. The sun tracking growing system of claim 1, wherein the pivot axis about which each tapered body pivots is a substantially horizontal pivot axis.

7. The sun tracking growing system of claim 1, wherein the pivot axis about which each tapered body pivots is a substantially vertical pivot axis.

8. The sun tracking growing system of claim 1, wherein the plurality of tapered bodies are positioned in parallel spaced relation, the plurality of tapered bodies tracking the sun in unison.

9. The sun tracking growing system of claim 8, wherein the plurality of tapered bodies are secured to a parallelogram frame or linkage that causes the plurality of tapered bodies to move in unison.

10. The sun tracking system of claim 9, wherein the array comprises multiple rows and the multiple rows are linked together and secured to multiple parallelogram frames or linkages that cause the plurality of bodies to move in unison.

11. The sun tracking growing system of claim 1, wherein each tapered body is wedge-shaped.

12. The sun tracking growing system of claim 11, wherein, relative to the top portion of the tapered body, an angle of the first face and an angle of the second face is equal, such that the first face and the second face receive equal sun exposure.

13. The sun tracking growing system of claim 11, wherein, relative to the top portion of the tapered body, an angle of the first face and an angle of the second face is unequal, such that the first face and the second face are exposed to sunlight and receive unequal sun exposure.

14. The sun tracking growing system of claim 1, wherein an artificial light source is supported by one or more of the plurality of tapered bodies to provide artificial light to the plant supports when sunlight is not available.

15. The sun tracking growing system of claim 1, wherein the sun tracking mechanism includes a hydraulic or mechanical spring actuator to assist in movement of one or more of the plurality of tapered bodies.

16. The sun tracking growing system of claim 1, wherein the sun tracking mechanism includes weights and pulleys to assist in movement of one or more of the plurality of tapered bodies.

17. The sun tracking growing system of claim 1, wherein the sun tracking mechanism comprises sensors mounted to each of the first face and the second face, with a controller that receives input from the sensors and causes the plurality of tapered bodies to move about the pivot axis to maintain a specified relationship between input received from sensors on the first face and input received from sensors on the second face.

18. The sun tracking growing system of claim 1, wherein the sun tracking mechanism comprising a controller that receives input from the calculation of sun's position and causes the plurality of tapered bodies to move about the pivot axis to maintain the selected portion of the peripheral connecting edge of the plurality of tapered bodies facing the sun.

19. A method of having a growing system tracking the sun, comprising:
    providing a tapered body having a first face, a second face opposed to the first face and a peripheral connecting edge that connects the first face and the second face, the first face and the second face tapering toward a top portion of the peripheral connecting edge such that the first face and the second face are on opposite sides of the peripheral connecting edge and face outward relative to the peripheral connecting edge, the peripheral connecting edge having a surface area that is smaller than a surface area of the first face and the second face;
    mounting the tapered body to pivot about a pivot axis;
    placing plants into plant supports which are supported by the tapered body along the first face, the second face or both;
    sensing or calculating the position of the sun;
    pivoting the tapered body about the pivot axis to maintain the top portion of the tapered body facing the sun so as to provide desirable and naturally attenuated sunlight exposure according to plants' needs on both faces throughout a day.

* * * * *